United States Patent Office 3,780,160
Patented Dec. 18, 1973

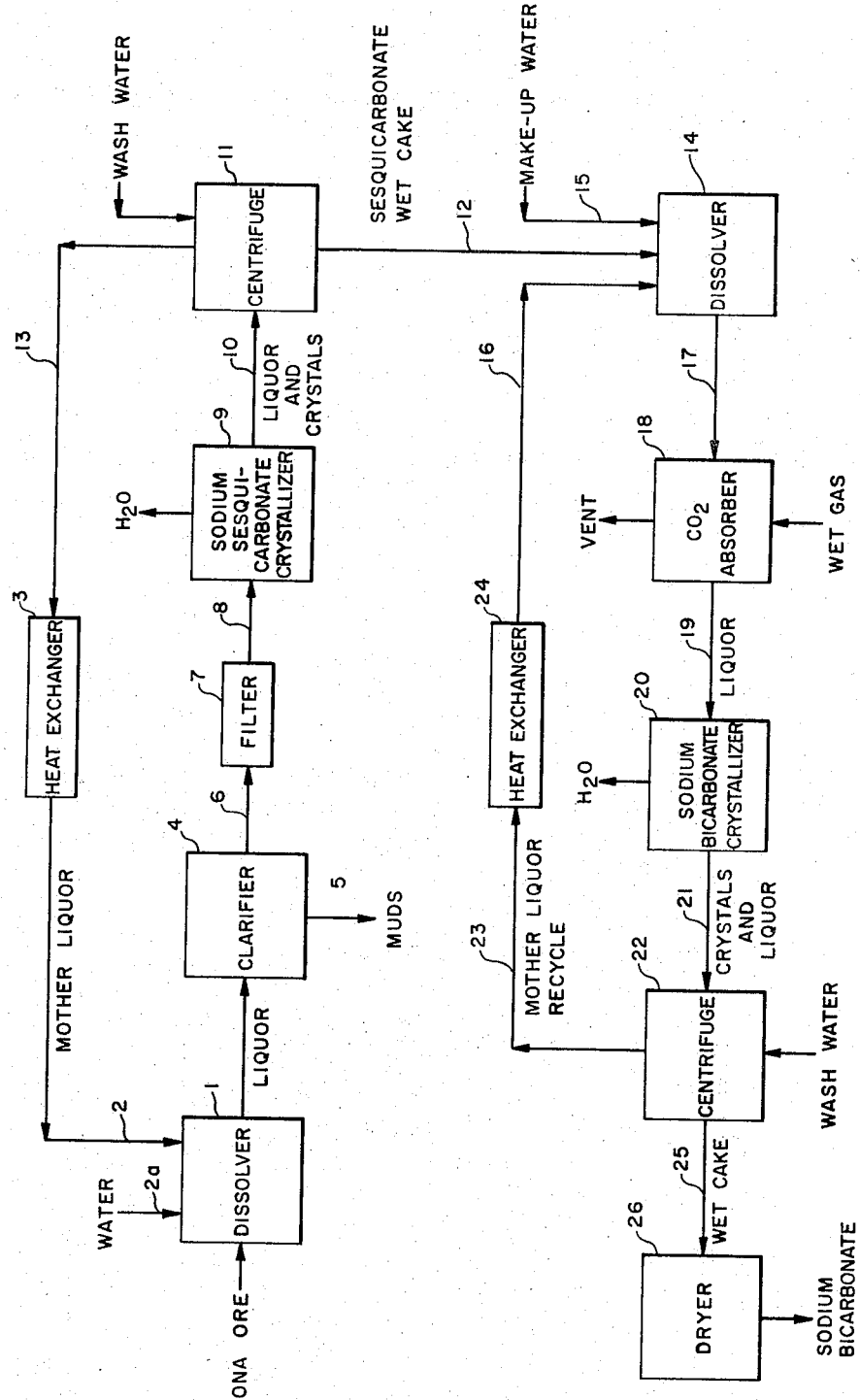

3,780,160
CARBONATION PROCESS FOR THE MANUFACTURE OF SODIUM BICARBONATE
Richard W. Waggener, Green River, and James D. Taylor, Rock Springs, Wyo., assignors to Intermountain Research and Development Corporation, Green River, Wyo.
Filed Aug. 2, 1971, Ser. No. 168,306
Int. Cl. B01d 9/02; C01d 7/10
U.S. Cl. 423—186                                  3 Claims

ABSTRACT OF THE DISCLOSURE

Sodium bicarbonate is produced from trona by dissolving trona in an aqueous solvent, removing insolubles from the resulting solution, crystallizing sodium sesquicarbonate, dissolving the sodium sesquicarbonate crystals in an aqueous solvent, carbonating the sodium sesquicarbonate solution and crystallizing sodium bicarbonate from the carbonated solution.

BACKGROUND OF THE INVENTION

(A) Field of the invention

This invention relates to production of sodium bicarbonate from trona by recovering sodium sesquicarbonate from the trona and crystallizing sodium bicarbonate from a carbonated solution of sodium sesquicarbonate.

(B) Description of the prior art

Sodium bicarbonate can be produced by carbonating soda ash solution. In this method a sodium carbonate feed solution is fed into the top of a carbonation tower while carbon dioxide or purified kiln gas is passed countercurrent to the flow of solution. Such towers utilize cooling coils which are necessary to cool the carbonate solution to about 40° C. before being carbonated. A slurry of sodium bicarbonate crystals is formed within the tower, under these treating conditions, and is removed from the bottom as the product. Unfortunately, the cooling coils which are present in these towers are prone to salting and frequent shutdown are required so that maintenance can be performed for the removal of scale and the like. In addition, this process yields extremely small size crystals which are not suitable for many industrial purposes.

One source of sodium carbonate and/or sodium bicarbonate values which has been suggested for the production of sodium bicarbonate is trona. Crude trona, for example, from the state of Wyoming, consists of about 94 to 96% of sodium sesquicarbonate

($NaCO_3 \cdot NaHCO_3 \cdot 2H_2O$)

mixed with about 4 to 6% of insoluble impurities and contains small amounts of iron, sulfates, chlorides, etc. A typical trona analysis is 45.11% $Na_2CO_3$, 35.75% $NaHCO_3$, 15.32% water, 0.03% NaCl, 0.01% $Na_2SO_4$, 0.11% $Fe_2O_3$ and 3.75% insolubles. The analysis will differ depending upon the location in the mine from which the trona is removed, some portions carrying larger or smaller percentages of insolubles and other impurities.

Trona has been mainly used to produce sodium carbonate (soda ash) by a variety of processes which basically consist of dissolving crude trona or calcined crude trona in an aqueous solvent, separating the insoluble impurities therefrom, crystallizing sodium sesquicarbonate, sodium carbonate monohydrate or anhydrous sodium carbonate from the solution, separating the crystals from the mother liquor and calcining or drying the crystals to produce soda ash. Examples of such processes are described in U.S. Pats. No. 2,639,217, 2,770,524 and 2,962,348.

However, in spite of the drawbacks of the above described process for producing sodium bicarbonate, no process has been developed thus far for producing this product, either from trona or other carbonate sources, in which the crystal growth can be readily controlled and, if desired, large sized crystals of sodium bicarbonate can be obtained.

SUMMARY OF THE INVENTION

It has now been found that sodium bicarbonate can be produced from trona in sufficiently large sized crystals to facilitate drying and using this product, and in which the crystal size of the product can be readily controlled. These results are obtained by dissolving the trona in an aqueous solvent to form an aqueous solution of sodium bicarbonate and sodium carbonate, removing insolubles from said solution, crystallizing sodium sesquicarbonate from this solution to form a slurry, separating the sodium sesquicarbonate crystals from the slurry, dissolving the separated crystals in an aqueous solvent to form a second solution of sodium bicarbonate and sodium carbonate, carbonating the second solution to form a solution from which sodium bicarbonate can be crystallized, crystallizing sodium bicarbonate from the second solution to form a slurry of sodium bicarbonate crystals in mother liquor, separating sodium bicarbonate crystals from the mother liquor and drying the crystals to obtain sodium bicarbonate having either high or low bulk density.

BRIEF DESCRIPTION OF THE DRAWING

The drawing illustrates a flow sheet which describes one embodiment of the instant process for producing sodium bicarbonate from trona.

DESCRIPTION OF THE INVENTION AND THE PREFERRED EMBODIMENTS

In the instant process carbonation of the sodium sesquicarbonate solution and crystallization of the sodium bicarbonate therefrom are performed in separate steps. This is in direct contrast to the prior art processes in which the carbonization and crystallization occur simultaneously and in which appropriate control of crystal size cannot be readily obtained. In the instant process it is possible to have accurate control over crystal growth of the final sodium bicarbonate product by varying the parameters under which the crystallizer is operated. Product density is dependent upon the type of crystal grown. Growth of large, simple crystals result in a material having a high bulk density of good flowability. Formation of crystal agglomerates is necessary to obtain a low bulk density.

The invention can best be described with reference to the attached drawing. In the drawing, the crude trona removed from the mine is preferably crushed to minus 8 mesh and is introduced into an insulated dissolving tank 1 wherein it is dissolved in hot recycled mother liquor from line 2 which has been reheated to about 100° C. in heater 3 and makeup water from line 2a. From dissolvers 1, the aqueous trona solution carrying insoluble material therein flows into insulated clarifiers 4 in which most of the muds in the slurries settle out and are removed from under flow line 5. If desired, the muds can be mixed with makeup water to reduce the calcium content of the water and recover additional carbonate values from the muds. The water of reduced calcium content may be used as makeup water in the process and the lower calcium content of the water provides an end product—sodium bicarbonate—with reduced calcium content and better size crystals, as a high calcium content in the crystallizer liquors tends to reduce the effectiveness of the crystallization promoters and produce small size crystals.

The clarified trona solution flows through line 6 to filter 7 and after passing through the filter, the aqueous trona solution flows through line 8 to vacuum crystallizer 9 where the temperature of the solution is reduced to about 45° C. to crystallize sodium sesquicarbonate therefrom. Although one crystallizer is illustrated in FIG. 1, any number of crystallizers may be used. The anionic crystallization modifier can be added to the aqueous trona solution just prior to its entry into the crystallizers.

The slurry of sodium sesquicarbonate crystals from the crystallizer 9 flows through line 10 to centrifuge 11 where the mother liquor is separated from the crystals. The mother liquor is recycled by line 13 to heater 3 and then to the trona dissolver 1. The sodium sesquicarbonate crystals are passed by line 12 to dissolver 14 where they are dissolved in makeup water of low calcium content from line 15 and hot mother liquor from line 16 to obtain a solution of sodium carbonate and sodium bicarbonate at 97° C.

The said aqueous solution is passed by line 17 to carbon dioxide absorber 18 wherein the sodium carbonate in the aqueous solution is carbonated to obtain an aqueous solution saturated with sodium bicarbonate at about 97° C. The said solution is passed from absorber 18 by line 19 to crystallizer 20 wherein the solution is cooled and evaporated to effect crystallization of sodium bicarbonate therefrom. The carbonation absorber may be a carbonation tower or agitated tank operating under pressure. The resulting sodium bicarbonate slurry is passed by line 21 to centrifuge 22 where the mother liquor is separated from the crystals. The mother liquor is recycled by line 23 to heat exchanger 24 and then to dissolver 14 and sodium bicarbonate crystals are passed by line 25 to drayer 26 for drying and then obtained as dry sodium bicarbonate having crystals of controlled size and density.

EXAMPLE 1

In Table I, there is a material balance for a plant producing 50,000 tons of sodium bicarbonate per year utilizing the flow sheet of the drawing.

The preferred mode of carrying out the process of the invention comprises dissolving the trona in an aqueous solvent to form an aqueous solvent of sodium bicarbonate and sodium carbonate, removing the insolubles from the said solution, crystallizing sodium sesquicarbonate to form a slurry of the said crystals in mother liquor, separating the crystals from the mother liquor, recycling the mother liquor to dissolve more trona, dissolving the sodium sesquicarbonate crystals in an aqueous solvent, carbonating the resulting solution to form a saturated sodium bicarbonate solution, crystallizing sodium bicarbonate by vacuum cooling to form a slurry of sodium bicarbonate, separating the mother liquor from sodium bicarbonate crystals and recycling it to dissolve additional sodium sesquicarbonate, and drying the sodium bicarbonate crystals to obtain a granular product.

With respect to the size of sodium bicarbonate crystals obtained, crystal growth rate is directly proportional to the supersaturation created within a crystallization system, but nucleation or formation of new crystals follows an exponential function of supersaturation. To those skilled in the art, it is obvious that supersaturation can be created within a crystallizer in several ways. However, in order to suppress nucleation and allow existing crystals to obtain a larger size, it is necessary to operate at low supersaturation values. In addition, the amount of crystal surface area available for growth when this supersaturation is created affects the crystal size distribution of the final product.

Below are typical crystal size distributions obtained from a recirculating magma "Krystal" unit at two different operating conditions. In Run A, where a high supersaturation level (ratio of feed rate to recirculating rate was high), a high temperature difference between feed and body temperature of 45° C., and a low crystal content of 10 weight percent within the fluidized portion of the unit were held, a product having a low bulk density and poor crystal size distribution was obtained. The resulting product contained agglomerates of poorly formed crystals having no definite habit. In Run B, the supersaturation was lowered by decreasing the feed rate to recirculating rate ratio and by decreasing the temperature difference to 33° C. The crystal concentration within the fluidized bed was also increased to over 20 weight percent. At these conditions, a coarser particle size distribution resulted, having a definite crystal habit.

TABLE I

| | | | Rates in pounds per minute | | | |
|---|---|---|---|---|---|---|
| | $Na_2CO_3$ | $NaHCO_3$ | $H_2O$ | Insolubles | $CO_2$ | Total |
| Sesquicarbonate section: | | | | | | |
| Trona feed to dissolver 1 | 88.4 | 70.2 | 30.0 | 7.4 | | 196.0 |
| Makeup water 2a to dissolver 1 | | | 59.8 | | | 59.8 |
| Recycle liquor 2 to dissolver 1 | 223.0 | 55.0 | 987.0 | | | 1,265.0 |
| Dissolver overflow | 311.4 | 125.2 | 1,076.8 | 7.4 | | 1,520.8 |
| Clarifier underflow 5 | 0.9 | 0.8 | 5.7 | 7.4 | | 14.8 |
| Crystallizer feed 8 | 310.5 | 124.4 | 1,071.1 | | | 1,506.0 |
| Vapor from crystallizer 9 | | | 99.5 | | | 99.5 |
| Liquor 10 from crystallizer 8 | 223.0 | 55.0 | 942.0 | | | 1,220.0 |
| Crystals 10 from crystallizer 9 | 87.5 | 69.4 | 29.6 | | | 186.5 |
| Wash water to centrifuge | | | 50 | | | 50.0 |
| Crystals from centrifuge 11 | 87.5 | 69.4 | 29.6 | | | 186.5 |
| Water with crystals | | | 5.0 | | | 5.0 |
| Sodium bicarbonate section: | | | | | | |
| Makeup water 15 to dissolver 14 | | | 138.1 | | | 138.1 |
| Dissolver overflow in line 17 | 509.5 | 274.4 | 2,462.6 | | | 3,246.5 |
| Wet gas to absorbers | | | 16.3 | | 59.4 | 75.7 |
| Vent gas from absorbers | | | 1.1 | | 23.2 | 24.3 |
| Absorber outlet—line 19 | 422.0 | 413.0 | 2,462.9 | | | 3,297.9 |
| Vapor from crystallizer 20 | | | 246 | | | 246.0 |
| Crystals from crystallizer 20 | | 217.0 | | | | 217.0 |
| Liquor from crystallizer 20 | 422.0 | 196.0 | 2,216.9 | | | 2,834.9 |
| Wash water to centrifuge 22 | | | 90 | | | 90.0 |
| Mother liquor 23 from centrifuge 22 | 422.0 | 205.0 | 2,294.9 | | | 2,921.9 |
| Wet $NaHCO_3$ 25 from centrifuge 22 | | 208 | 12 | | | 220.0 |
| Crystals from dryer 26 | | 208 | | | | 208.0 |

| | Run A | Run B |
|---|---|---|
| B.D., lb. per cubic foot | 40 | 60 |
| +20 U.S. mesh, percent retained | 0.0 | 0.0 |
| +80 U.S. mesh, percent retained | 67.6 | 88.0 |
| +100 U.S. mesh, percent retained | 80.2 | 95.0 |
| +200 U.S. mesh, percent retained | 97.4 | 99.8 |
| Feed rate, g.p.m | 250 | 225 |
| Feed temp., ° C | 93 | 93 |
| Body temp., ° C | 48 | 60 |
| Slurry conc., percent | 8–10 | 20–23 |
| Circulation rate, g.p.m | 4,000 | 8,003 |

In order to obtain crystals of optimum size and highest density, an anionic crystal growth modifier capable of modifying the size of the sodium bicarbonate crystals may be introduced into the aqueous sodium bicarbonate containing solution before crystallization. The preferred crystallization additives are (1) alkyl benzene sulfonates having at least 8 alkyl carbon atoms, (2) alkyl naphthenate sulfonates having at least 4 alkyl carbon atoms, (3) primry alkanol sulfates having at least 10 carbon atoms and (4) N-substituted taurines of the formula

R'R"N—CH$_2$CH$_2$SO$_3$M wherein R' is a hydrocarbon radical, R" is the acyl radical of a higher fatty acid and M is an alkali metal, although other anionic crystallization promoters may be used. The use of the promoters is shown in U.S. Pat. No. 3,072,466 and they are usually present in the crystallization solution at a concentration of 10 to 800 p.p.m.

To obtain product having a low density, the crystallizer operating variables are adjusted to conditions which promote poor crystal growth. The supersaturation level is increased and the crystal surface area for growth is decreased in order to form the crystal agglomerates necessary to give the low density.

Additional makeup water has to be added in the trona dissolver and in the sodium sesquicarbonate dissolver when the mother liquors are recycled to the dissolvers. Any water added to the system preferably has a low calcium content to keep the total hardness of the solution from which sodium bicarbonate is crystallized below 100 p.p.m. Unsoftened makeup water can cause turbidity in the sodium bicarbonate crystallizer. High calcium levels of about 300 to 400 p.p.m. in the crystallizer feed solution can turn the product grey because of its containing hardness of about 1000 p.p.m. However, a high calcium level can also increase crystal twinning which may be helpful if the goal is to produce a low density product, but the grey color makes this an undesirable method.

The preferred method of reducing the calcium content of the makeup water is to wash the insolubles removed from the solution in which trona was dissolved. These insolubles still contain some unrecovered carbonate values and washing the muds dissolves any undissolved trona and the calcium in the wash water is precipitated therefrom as calcium carbonate. This method not only avoids the necessity of separate water softening apparatus but also recovers carbonate values which would otherwise be lost.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:

1. A process for the production of sodium bicarbonate from trona which comprises dissolving trona in an aqueous solvent to form an aqueous solution of sodium carbonate and sodium bicarbonate in proportions sufficient to form sodium sesquicarbonate on crystallization, removing insolubles from the said solution, crystallizing sodium sesquicarbonate from said solution to form a slurry of crystals in mother liquor, separating the sodium sesquicarbonate crystals from the mother liquor, dissolving the sodium sesquicarbonate crystals in an aqueous solvent, carbonating the resulting solution to form a second solution from which sodium bicarbonate can be crystallized, crystallizing sodium bicarbonate from the said second solution in a zone separate from the zone in which carbonating of said resulting solution is carried out, separating the sodium bicarbonate crystals from their mother liquor and drying the said crystals to obtain sodium bicarbonate having either a high or low bulk density.

2. The process of claim 1 wherein an anionic crystallization modifier is added to the solution obtained by the dissolution of the sodium sesquicarbonate crystals.

3. A process for the production of sodium bicarbonate having a controlled bulk density, coarse size distribution, and excellent flow properties from trona which comprises dissolving trona in an aqueous solvent to form an aqueous solution of sodium carbonate and sodium bicarbonate in proportions sufficient to form sodium sesquicarbonate on crystallization, clarifying the said solution to remove insolubles therefrom, crystallizing sodium sesquicarbonate from the said solution, separating the sodium sesquicarbonate crystals from the mother liquor, recycling the mother liquor to dissolve trona, washing the insolubles with makeup water to soften the water and to recover additional carbonate values, adding the softened makeup water to dissolve trona, dissolving the sodium sesquicarbonate crystals in an aqueous solvent, carbonating the resulting solution to form a second solution from which sodium bicarbonate can be crystallized, crystallizing sodium bicarbonate from the said second solution in a zone separate from the zone in which carbonating of said resulting solution is carried out to form a slurry of sodium bicarbonate crystals in mother liquor, separating the said crystals from the bicarbonate mother liquor, recycling the bicarbonate mother liquor to dissolve additional sodium sesquicarbonate crystals and drying the sodium bicarbonate crystals.

References Cited

UNITED STATES PATENTS

| | | | |
|---|---|---|---|
| 2,780,520 | 2/1957 | Pike | 23—302 |
| 3,072,466 | 1/1963 | Bauer et al. | 23—300 |
| 2,704,239 | 3/1965 | Pike | 23—302 |
| 1,865,833 | 7/1932 | Chesny | 423—189 |
| 2,926,995 | 3/1960 | Mod et al. | 23—302 |
| 3,233,983 | 2/1966 | Bauer et al. | 23—302 |

NORMAN YUDKOFF, Primary Examiner

C. P. RIBANDO, Assistant Examiner

U.S. Cl. X.R.

23—189, 302; 423—422, 47

UNITED STATES PATENT OFFICE
CERTIFICATE OF CORRECTION

Patent No. 3,780,160          Dated December 18, 1973

Inventor(s) Richard W. Waggener and James D. Taylor

It is certified that error appears in the above-identified patent and that said Letters Patent are hereby corrected as shown below:

Column 1, line 42, "shutdown" should read --shutdowns--.

Column 2, line 15, "aquoeus" should read --aqueous--.

Column 3, line 34, "drayer" should read --dryer--.

Column 4, line 75, "8003" should read --8000--.

Signed and sealed this 3rd day of June 1975.

(SEAL)
Attest:

RUTH C. MASON
Attesting Officer

C. MARSHALL DANN
Commissioner of Patents
and Trademarks